July 7, 1964
F. J. RUSSELL
3,140,179
PHOTOGRAPHIC ELEMENT HAVING INCREASED
SPEED AND CONTRAST
Filed Oct. 22, 1959
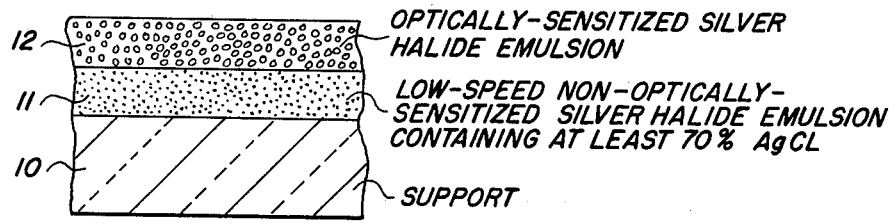
FREDERICK J. RUSSELL
INVENTOR.
BY
ATTORNEYS

United States Patent Office 3,140,179
Patented July 7, 1964

3,140,179
PHOTOGRAPHIC ELEMENT HAVING INCREASED SPEED AND CONTRAST
Frederick J. Russell, Rochester, N.Y., assignor to Eastman Kodak Company, Rochester, N.Y., a corporation of New Jersey
Filed Oct. 22, 1959, Ser. No. 847,936
6 Claims. (Cl. 96—68)

This invention relates to photography and particularly to a method of improving the speed and contrast of silver halide emulsions.

Various methods have been suggested for improving the speed and contrast characteristics of silver halide emulsions, the most common of which is the addition of various addenda to the emulsion. I have found that the speed, contrast and other characteristics of an optically-sensitized silver halide emulsion can be improved by coating as a separate layer underneath the emulsion a silver chloride emulsion, or silver halide emulsion which is composed predominantly of silver chloride, and having sufficiently low speed that no visible image is produced in it by exposure and development of the optically-sensitized emulsion. The optically-sensitized silver halide emulsion should have a blue light sensitivity at least 100 times greater than that of the silver chloride or predominantly silver chloride emulsion.

The accompanying drawing shows in enlarged sectional view a film or paper made according to my invention.

The composition of the emulsions used according to my invention is an important factor in obtaining the improved speed and contrast characteristics. The optically-sensitized emulsion should be either a silver bromoiodide emulsion or a silver chlorobromide emulsion containing at least 50 mol percent silver bromide. The sensitizing of this emulsion is not critical, any sensitizer being suitable which sensitizes the silver bromide or silver chlorobromide to different portions of the visible spectrum. For example, these emulsions can be sensitized with one or more (e.g., 1 to 3) of the cyanine dyes described in U.S. Patents 1,990,681; 1,990,507 and 2,241,237.

The undercoat emulsion may be a pure silver chloride emulsion or a silver chlorobromide emulsion containing at least 70 mol percent silver chloride; for example, an 80:20 silver chlorobromide emulsion is suitable. This emulsion should be of sufficiently low speed that no visible image is produced in it by exposure and development of the optically-sensitized emulsion. I have found that if the optically-sensitized emulsion is at least 100 times the speed of the low speed emulsion, no visible image will ordinarily be produced in the low speed emulsion.

The following examples illustrate my invention:

Example 1

This example illustrates a coating of silver chloride emulsion between the optically-sensitized emulsion and the support.

A fine-grain gelatino-silver-chloride emulsion was coated at 1080 mgs. of silver per square foot on a cellulose acetate support and then overcoated at 534.6 mgs. of silver per square foot with a panchromatically sensitized (optically sensitized) gelatino-silver bromoiodide emulsion which had been sulfur- and gold-sensitized in the customary manner. The resulting film coating was exposed on an Eastman I-B sensitometer together with a coating of the optically-sensitized emulsion without the silver chloride undercoat, and both coatings were processed for 5, 8 and 12 minutes in Kodak Developer DK-50 (Kodak Data Book—"Processing Chemicals and Formulas," 5th Edition, page 40) with the following results:

|  | Dev. 5′, DK-50 | | | Dev. 8′, DK-50 | | | Dev. 12′, DK-50 | | |
|---|---|---|---|---|---|---|---|---|---|
|  | Speed | γ | Fog | Speed | γ | Fog | Speed | γ | Fog |
| No undercoat | 365 | .66 | .20 | 374 | .86 | .27 | 376 | .89 | .37 |
| AgCl undercoat | 366 | .72 | .11 | 384 | .89 | .17 | 392 | 1.04 | .26 |

The table shows that the speed has increased, especially at the 8 minute and 12 minute development times, and that in every case the fog has been reduced by the silver chloride undercoat.

Example 2

A high-speed gelatino-silver bromoiodide emulsion was coated over a series of slow silver chlorobromide emulsions each containing 80 mol percent chloride and 20 mol percent bromide. The chlorobromide emulsions varied from very fine grained to coarse grained emulsions. These were coated on film base and were exposed to an intensity scale sensitometer for $1/100$ second and 100 seconds, and processed for 3 minutes in Kodak Developer DK-50, fixed, washed and dried with the following results:

|  | Relative Speed of Chlorobromide U-Coat | Relative Speed, Top Layer/U-Coat | Relative Speed of Two-Layer Coatings | |
|---|---|---|---|---|
|  |  |  | 1/100″ Exp. | 100″ Exp. |
| 1 | Check (no U-coat) |  | 100 | 100 |
| 2 | .052 | 1,920 | 132 | 139 |
| 3 | .055 | 1,820 | 139 | 145 |
| 4 | .077 | 1,300 | 145 | 139 |
| 5 | .030 | 3,333 | 132 | 152 |
| 6 | .29 | 345 | 120 | 159 |

It will be seen that in every case there was an appreciable increase in speed over the relative speed of the coating which did not have the silver chlorobromide undercoat.

Example 3

Separate supports were coated with a fine-grain silver chloride emulsion and a fine-grain 80:20 silver chlorobromide emulsion. These emulsions were overcoated separately with a high-speed panchromatically sensitized (optically sensitized) coarse-grain silver bromoiodide emulsion. The coatings were dried, exposed on an Eastman I-B sensitometer and processed for 12 minutes in Kodak Developer DK-50. The results of these tests were as follows:

|  | Speed | γ | Fog |
|---|---|---|---|
| High-speed, optically-sensitized silver bromoiodide emulsion | 340 | 1.18 | .11 |
| Same, coated on AgCl emulsion | 352 | 1.27 | .14 |
| Same, coated on 80:20 silver chlorobromide emulsion | 358 | 1.19 | .11 |

This table shows an increase in speed of the coatings having the silver chloride or silver chlorobromide undercoats.

The drawing illustrates a film made according to my invention in which a support 10 of cellulose ester, paper or other suitable material is coated with a layer 11 of low-speed, non-optically sensitized silver halide emulsion containing at least 70% silver chloride, the layer 11 being coated with a layer 12 of optically-sensitized silver halide emulsion.

The examples and modifications included herein are illustrative only, it being understood that my invention is to be taken as limited only by the scope of the appended claims.

I claim:

1. A light-sensitive photographic element of improved speed and contrast, comprising a transparent support and in superposed, contacting relationship in outer panchromatically-sensitized silver halide emulsion layer (I) wherein the silver halide is (A) selected from the class consisting of silver chlorobromide containing at least 50 mole percent silver bromide and silver bromoiodide, and is (B) capable of producing a visible image upon exposure and development in a silver halide developer, and beneath said layer (I) a non-optically sensitized, substantially light-insensitive, fine-grained silver halide emulsion layer (II) wherein at least 70 mole percent of the silver halide is (C) silver chloride and is (D) of sufficiently low speed so that no visible image is produced when separately exposed on a separate support to radiation producing an image in said panchromatically-sensitized silver halide emulsion upon photographic development, said non-optically sensitized, substantially light-insensitive silver halide emulsion layer being closer to said support than said panchromatically-sensitized silver halide emulsion layer, the relative speed of said silver halide emulsion layer (II) between about 0.03 and 0.29, and the relative speed of said silver halide emulsion layer (I) being from about 100 to 3333 times that of said silver halide emulsion layer (II).

2. A light-sensitive photographic element of claim 1 wherein the panchromatically-sensitized silver halide emulsion layer (I) contains silver bromoiodide as the silver halide.

3. A light-sensitive photographic element of claim 2 wherein the light-insensitive silver halide emulsion layer (II) contains silver chloride as the silver halide.

4. A light-sensitive photographic element of claim 2 wherein the light-insensitive silver halide emulsion layer (II) contains silver chlorobromide containing 80 mole percent silver chloride.

5. A method of producing photographic images of improved contrast comprising exposing to panchromatic radiation a light-sensitive photographic element of improved speed and contrast, comprising a transparent support and in superposed, contacting relationship an outer panchromatically-sensitized silver halide emulsion layer (I) wherein the silver halide is (A) selected from the class consisting of silver chlorobromide containing at least 50 mole percent silver bromide and silver bromoiodide, and is (B) capable of producing a visible image upon exposure and development in a silver halide developer, and beneath said layer (I) a non-optically sensitized, substantially light-insensitive, fine-grained silver halide emulsion layer (II) wherein at least 70 mole percent of the silver halide is (C) silver chloride and is (D) of sufficiently low speed so that no visible image is produced when separately exposed on a separate support to radiation producing an image in said panchromatically-sensitized silver halide emulsion upon photographic development, said non-optically sensitized, substantially light-insensitive silver halide emulsion layer being closer to said support than said panchromatically-sensitized silver halide emulsion layer, the relative speed of said silver halide emulsion layer (II) being between about 0.03 and 0.29, and the relative speed of said silver halide emulsion layer (I) being from about 100 to 3333 times that of said silver halide emulsion layer (II), and developing said light-sensitive photographic element in a photographic developer containing a photographic developing agent and producing a black-and-white negative image.

6. In the process of forming a negative silver image in an imagewise exposed silver halide material, said process including the steps of black and white development, fixing, washing an drying said silver halide material to form a permanent negative image therein, the improvement which consists of using as the light sensitive material a photographic element carrying on a plastic transparent support in the following order, a slow-speed gelatin silver chloride emulsion layer, and in integral contiguous contact with said silver chloride emulsion layer, a high-speed gelatin silver halide emulsion layer in which the silver halide emulsion is selected from the group consisting of silver chlorobromide containing at least 50 mole percent silver bromide and silver bromoiodide emulsions, the photographic effects of said improvement being such as to increase the effective speed and gradient of the silver image in the silver halide emulsion layer without the formation of a silver image in the silver chloride emulsion layer.

References Cited in the file of this patent

UNITED STATES PATENTS

| | | |
|---|---|---|
| 656,751 | Schwarz | Aug. 28, 1900 |
| 746,594 | Smith | Dec. 8, 1903 |
| 1,303,635 | Capstaff | May 13, 1919 |
| 2,202,026 | Renwick | Mar. 28, 1940 |
| 2,712,995 | Weyde | July 12, 1955 |
| 2,725,296 | Kendall | Nov. 29, 1955 |
| 3,050,391 | Thompson et al. | Aug. 21, 1962 |

OTHER REFERENCES

The Focal Encyclopedia of Photography, page 596, The Focal Press, New York (1957). Copy in Scientific Library.

Baines: "The Science of Photography," pages 147–151, John Wiley and Sons, Inc., New York (1958). Copy in Scientific Library.)